US009076307B2

(12) United States Patent
Masen

(10) Patent No.: US 9,076,307 B2
(45) Date of Patent: Jul. 7, 2015

(54) METHODS AND APPARATUS FOR AN EGM BONUS FEATURE

(75) Inventor: Andrew B. Masen, Grafton (AU)

(73) Assignee: Bally Technologies ANZ PTY LTD, Milperra NSW (AU)

( * ) Notice: Subject to any disclaimer, the term of this patent is extended or adjusted under 35 U.S.C. 154(b) by 1163 days.

(21) Appl. No.: 12/451,961

(22) PCT Filed: Jun. 6, 2008

(86) PCT No.: PCT/AU2008/000810
§ 371 (c)(1),
(2), (4) Date: Mar. 29, 2010

(87) PCT Pub. No.: WO2008/148163
PCT Pub. Date: Dec. 11, 2008

(65) Prior Publication Data
US 2012/0270632 A1 Oct. 25, 2012

(30) Foreign Application Priority Data
Jun. 8, 2007 (AU) ................................ 2007903119

(51) Int. Cl.
*G06F 17/00* (2006.01)
*G06F 19/00* (2011.01)
*G07F 17/34* (2006.01)
*G07F 17/32* (2006.01)

(52) U.S. Cl.
CPC ............ *G07F 17/34* (2013.01); *G07F 17/3211* (2013.01)

(58) Field of Classification Search
USPC .................................... 463/16–20, 25, 29–31
See application file for complete search history.

(56) References Cited

U.S. PATENT DOCUMENTS

| | | | |
|---|---|---|---|
| 5,228,693 | A | 7/1993 | Howard |
| 5,653,444 | A | 8/1997 | Dahl |
| 5,722,891 | A | 3/1998 | Inoue |
| 5,980,384 | A | 11/1999 | Barrie |
| 6,474,649 | B1 | 11/2002 | Kennedy et al. |
| 6,874,786 | B2 | 4/2005 | Bruno et al. |
| 7,115,033 | B1 | 10/2006 | Timperley |

(Continued)

FOREIGN PATENT DOCUMENTS

| | | |
|---|---|---|
| EP | 1544811 | 6/2005 |
| EP | 1650720 | 4/2006 |

(Continued)

OTHER PUBLICATIONS

International Search Report and Written Opinion from related PCT patent application PCT/AU2008/000810 filed Jun. 6, 2008.

(Continued)

*Primary Examiner* — Milap Shah
(74) *Attorney, Agent, or Firm* — TraskBritt

(57) ABSTRACT

A method of incorporating a bonus symbol into a plurality of symbols to be displayed in a display of an electronic gaming machine, the display adapted to display at least a selected portion of a plurality of standard symbols, the method including the steps of: determining a number of bonus symbols to be displayed; for each bonus symbol to be displayed, determining a location at which the bonus symbol is to be displayed within the plurality of standard symbols; incorporating a bonus symbol with a corresponding standard symbol for the determined location; whereby the bonus symbol is incorporated into the plurality of symbols without affecting the standard symbol probabilities.

30 Claims, 9 Drawing Sheets

(56) References Cited

U.S. PATENT DOCUMENTS

| | | | | |
|---|---|---|---|---|
| 7,166,028 | B2 | 1/2007 | Fasbender et al. | |
| 7,329,180 | B2 | 2/2008 | Strom | |
| 7,371,171 | B1 | 5/2008 | Englman et al. | |
| 7,402,102 | B2 | 7/2008 | Marks et al. | |
| 7,448,948 | B2 | 11/2008 | Hughs-Baird et al. | |
| 7,503,847 | B2 | 3/2009 | Baerlocher | |
| 7,575,513 | B2 | 8/2009 | Strom | |
| 7,850,520 | B2 * | 12/2010 | Yoshimi | 463/20 |
| 2003/0013517 | A1 * | 1/2003 | Bennett et al. | 463/25 |
| 2004/0048646 | A1 * | 3/2004 | Visocnik | 463/16 |
| 2005/0159208 | A1 | 7/2005 | Pacey | |
| 2006/0084496 | A1 * | 4/2006 | Jaffe et al. | 463/20 |
| 2006/0128465 | A1 * | 6/2006 | Schultz et al. | 463/30 |
| 2006/0287060 | A1 * | 12/2006 | Yoshimi | 463/20 |
| 2007/0060252 | A1 * | 3/2007 | Taylor | 463/16 |
| 2007/0077986 | A1 | 4/2007 | Loose et al. | |

FOREIGN PATENT DOCUMENTS

| | | |
|---|---|---|
| GB | 2330936 | 5/1999 |
| JP | 2001-025539 | 1/2001 |
| JP | 2001-252393 | 9/2001 |
| WO | WO2001/072387 | 10/2001 |

OTHER PUBLICATIONS

International Preliminary Report on Patentability from related PCT patent application PCT/AU2008/000810 filed Jun. 6, 2008.

* cited by examiner

FIGURE 6
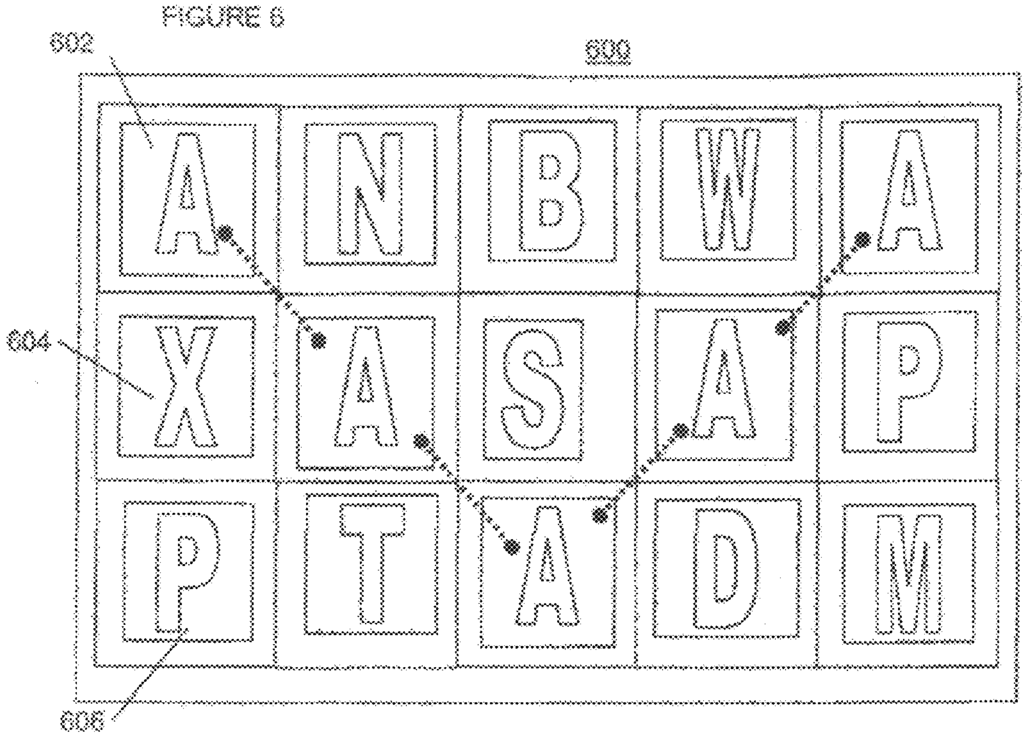
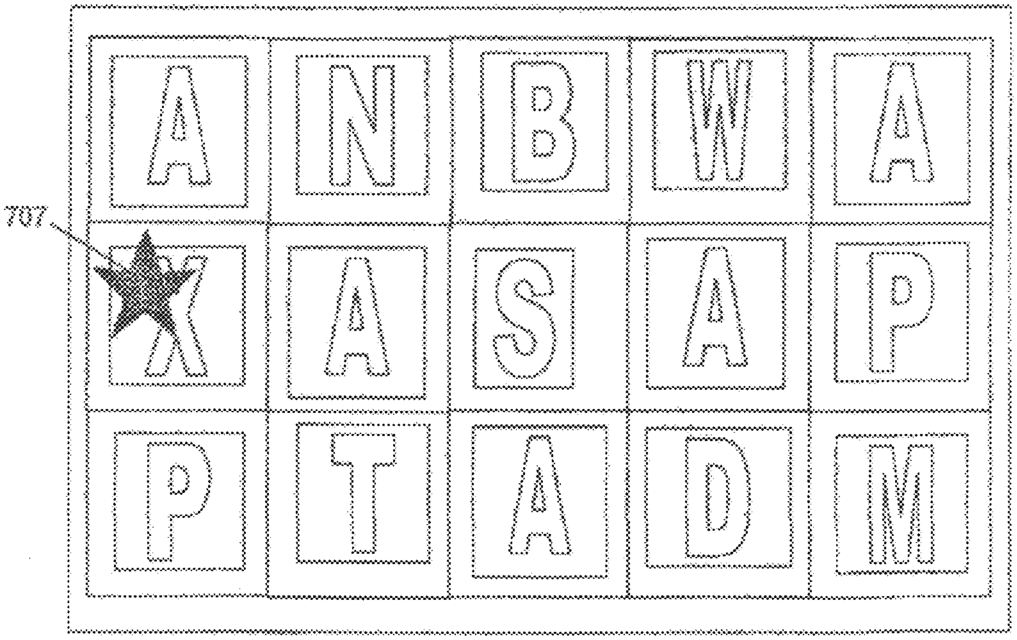
FIGURE 7

1000

A
B
C
D
E
L - 1
L
1
2
3
4
A
W
X
A
P
D
1002
1010
1004

METHODS AND APPARATUS FOR AN EGM BONUS FEATURE

CROSS-REFERENCE TO RELATED APPLICATIONS

This is a national phase entry under 35 U.S.C. §371 of International Patent Application PCT/AU2008/000810, filed Jun. 6, 2008, and published in English as International Patent Publication WO 2008/148163 A1 on Dec. 11, 2008, which claims the benefit under Article 8 of the Patent Cooperation Treaty to Australian Patent Application Serial No. 2007903119, filed Jun. 8, 2007.

TECHNICAL FIELD

This invention relates to a gaming machine having a bonus feature.

The invention is applicable to gaming machines in which a bonus symbol is added to a normal game feature by the inclusion of one or more bonus trigger symbols.

BACKGROUND

In this specification, unless the contrary is expressly stated, where a document, act or item of knowledge is referred to or discussed, this reference or discussion is not an admission that the document, act or item of knowledge, or any combination thereof, was at the priority date, publicly available, known to the public, part of common general knowledge, or known to be relevant to an attempt to solve any problem with which this specification is concerned.

There is an ongoing demand for new games and variations of games to maintain player interest. The provision of bonus features provides a method for maintaining player interest.

Reel-type gaming machines have an electronic simulation of a plurality of spinning reels. The individual reels stop in a position relative to a display to show one or more rows of symbols from adjacent reels in a window or in a virtual display and a matrix of rows and columns of symbols is displayed for analysis of winning or losing events. A common window configuration is three rows and five columns, but other combinations are also known. One or more paylines are defined in the window, for example, the centre row, the top row, the bottom row, and possibly one or more meander lines. Non-linear paylines and "scatter" pays are also known. The player may select (by wagering) one or more paylines per game. The paylines are normally selected in a fixed sequence; for example, if the player selects one payline, this will normally be the central horizontal line. Similarly, selecting two paylines will activate the centre payline and the top horizontal payline. The player may also select the amount wagered per line. A payline is active if the player has wagered sufficient paylines to include that payline or specifically selected individual paylines or groups of paylines. Paylines which are not active are inactive.

In a standard video format of such games on electronic gaming machines (hereinafter defined as "EGM" or "EGMs"), the virtual reels are made to appear to spin, each virtual symbol being made to appear to traverse its column in the window in a fixed sequence in relation to its adjacent symbols. When the virtual reels cease to spin, the virtual symbols displayed in the window on each active payline are compared with a paytable to determine if a prize has been won.

Bonus awards can be triggered when a bonus trigger symbol or bonus trigger event (e.g., specific multiple symbols or a random bonus event) is displayed in the window. The game has rules or algorithms or programs for determining the probability of a bonus trigger symbol being included on a reel.

In known systems, when it is desired to add a bonus trigger symbol to a reel, an additional symbol is added to the reel, virtual reel or into software providing virtual images. Thus, for a reel having L symbols in a standard game (physical reel or virtual reel), the reel with the bonus trigger symbol will have L+1 symbols. This, of course, alters the probabilities of the game. Accordingly, it is necessary to revise the payouts and odds with respect to the new probabilities to achieve the intended payout ratio or percentages.

Electronic gaming machines are capable of implementing different games on the same machine. Some of these games can have differing numbers of symbols on their reels. The inclusion of additional bonus trigger symbols in such machines may require the recalculation of probabilities for each different game.

Some slot machines include bonus features that are activated randomly or pseudo-randomly and the bonus features are normally independent of the results of the underlying or primary game. The result of the primary slot game is determined by the resulting symbols on the reels and the paylines being wagered on by the player, whereas bonus features are generally triggered independently of the result of the primary game. In some cases, the bonus features are triggered randomly by the EGM with no visual indicator shown, unless the bonus feature is actually triggered by specific visual or displayed events. In other cases, the bonus feature is triggered by the appearance of a bonus symbol in one of the active and, sometimes, the inactive paylines. This is called a symbol-driven method of triggering a feature, and the bonus symbols, or some other indicia, are added to the reel strip or strips or are identified by software as being part of a bonus triggering event. For example, in video poker games, the conventional symbols forming four-of-a-kind or a straight flush may be used to trigger a bonus event without having to add any additional symbols.

If the bonus feature is triggered by a symbol that is part of the reel strip (i.e., the bonus feature symbol occupies one of the positions on the reel strip), then the probability of the bonus or triggering symbol appearing (known as the feature hit rate) is based on the length of the reel (or total number of symbols in a virtual reel) and the number of triggering symbols that appear on the reel.

Any attempt to add common bonus features to a plurality of different games presents difficulties because different games have different reel lengths, different numbers of virtual symbols per different reels, and different probabilities for different symbols in virtual reels for different games, and to keep the hit rate of the bonus feature approximately constant would require that the game mathematics be modified for every different game. This adds additional expense and development time to game design and is therefore undesirable.

Therefore it is desirable to have a bonus feature and a method of triggering a bonus feature that operates independently of the underlying game and its particular features and mathematics.

U.S. Publication No. 2007/077986, now U.S. Pat. No. 7,585,220, issued Sep. 8, 2009, discloses a spinning reel slot machine comprising a plurality of mechanical rotatable reels and a video display. In response to a wager, the reels are rotated and stopped to randomly place symbols on the reels in visual association with a display area. The video display provides a video image superimposed upon the reels. The video image may be interactive with the reels and include such graphics as payout values, a paytable, paylines, bonus game features, special effects, thematic scenery, and instructional information.

U.S. Publication No. 2005/0159208, now U.S. Pat. No. 7,654,895, issued Feb. 2, 2010, discloses a slot-type gaming machine using an expandable symbol array to create a series of sequentially larger symbol arrays with the potential for additional or enhanced awards. The generation of the larger arrays can be performed through a variety a different mechanisms, such as the addition of a reel to the base array. The secondary arrays may be generated only under specific sets of circumstances that occur in the base array, including a winning payline, the occurrence of a bonus triggering symbol, etc. To increase player interest in the game, some embodiments include allowing the player to determine where the additional symbols to create the larger array are placed in the base array.

EP1544811 discloses a gaming machine having an enhanced game play scheme where, in response to receipt of a second wager to select an option, a player is provided with enhanced game play that may include, among other features, providing an extra wild symbol capable of repositioning.

U.S. Pat. No. 5,980,384 to Barrie discloses a gaming apparatus and method in which there is a primary game and a secondary game that are dynamically linked, and the primary game can be won independently of the secondary game. The primary game may be won on each play of the game, and the secondary game may be won over a plurality of plays of the primary game. Primary game symbols appearing during plays of the primary game may cause: (i) movement of primary game symbols to secondary game display positions; (ii) primary game symbols directing play options of secondary game symbols; (iii) changing the options open to the player in his or her attempt to win the secondary game; (iv) symbols in the primary game being used as soft buttons to affect movement of game symbols from the primary game to the secondary game, and between symbol display positions in the secondary game; and (v) secondary game symbols persisting to subsequent plays of the primary game to help the player to win at the secondary game.

It is desirable to provide an electronic gaming machine with the ability to incorporate bonus trigger symbols without affecting the standard game probabilities.

BRIEF SUMMARY

According to the present invention, there is provided a method of enhancing an underlying symbol display game, the underlying symbol display game having a plurality of symbol locations, each symbol location including a displayable symbol, wherein, in the underlying game, a predetermined number of symbol locations are selected and the respective symbols are displayed, the resultant combination of displayed symbols determining a winning or losing outcome of the underlying game, wherein the probability of each symbol location being selected and the respective symbol being displayed is a predetermined probability for the underlying symbol display game, the method comprising the steps of:

selecting a probability for the display of one or more bonus symbols to be incorporated into the underlying symbol display game over the course of play of one or more consecutive games, wherein the display of one or more bonus symbols at the conclusion of a game causes a bonus outcome;

determining a number of bonus symbols that need to be incorporated into the underlying symbol display game for each of the one or more consecutive games to meet the selected probability;

prior to commencing each of the one or more consecutive games, and for each of the determined number of bonus symbols that need to be incorporated:

selecting one of the symbol locations; and incorporating the bonus symbol in the selected symbol location with the respective displayable symbol;

wherein the incorporation of each of the determined number of bonus symbols has no affect upon the predetermined probability for the underlying symbol display game.

The location of at least one bonus symbol can be determined on a predetermined or pseudo-random basis.

The location of each and/or every bonus symbol (e.g., by selecting a template of bonus symbol locations rather than individual bonus symbol locations) can be determined on a pseudo-random basis.

The bonus symbols can be evenly or unevenly distributed through a subset of the standard symbols.

The display can be a simulation of a plurality of reels (e.g., virtual reels), each having a corresponding plurality of simulated (virtual) standard symbols.

Where the number of standard symbols on a reel is not an integer multiple of the bonus symbol probability, the number of bonus symbols added per game may be calculated (e.g., probabilities added or associated with each symbol) to provide an average number of bonus symbols, resulting in the desired or required probability over two or more games. For example, as the individual symbols on the reels, including blank spaces, are selected by a random number generator, each individual symbol may be assigned a probability, including probabilities other than its absolute mathematic probability, based on the total number of symbols. Thus, assuming twenty symbols, each symbol would ordinarily have a probability of 1/20 or 5%. The designer of the game can assign arbitrary or designed probabilities to the individual symbols so that one symbol is 4.5% and another is 5.5%, balancing each other out so that the total probability remains at 100% for available symbols. One symbol may be converted to 4.33% and two others to 5.33% and 5.34%, again retaining the 100% total. The important element to note is that, to assure the desired probability, without being restricted to whole numbers in assignment of probabilities, the random number generator may be provided with symbols having assigned probabilities other than whole numbers.

The number of games to obtain the average number of symbols can be minimized so that the average number of symbols is obtained with the minimum number of games. By using probabilities that include only 0.5% increments, the number can be minimized to two games, with increments of 0.33%, to three games and, with increments of 0.25%, to four games.

The bonus trigger symbol can be displayed in a semi-transparent form (e.g., transparently or translucently overlaying the standard symbol) so the underlying standard symbol can be identified by the player.

Another aspect of the invention is an electronic gaming machine adapted to display a selected number of rows of a plurality of reel simulations having a predetermined number of standard symbols per reel (or virtual reel), and to display, on average, a predetermined number of bonus symbols per game, wherein the EGM is adapted to display each bonus symbol as a combined virtual symbol having a virtual bonus symbol superimposed on a virtual standard symbol.

Each combined symbol can be substituted for a corresponding standard symbol.

Each combined symbol can be formed by adding an overlay to a standard symbol.

For each reel in which one or more bonus symbols is to be incorporated, a substitute reel including the combined symbol or symbols can be created.

Another aspect of the invention is a method of incorporating a bonus symbol into an electronic reel having a plurality of standard virtual symbols, each one of the plurality of standard virtual symbols being located at a unique location on the virtual reel, the virtual reel to be displayed on an Electronic Gaming Machine (EGM) display adapted to display at least a selected portion of the virtual reel, the method including the steps of:

determining the location at which the bonus virtual symbol is to be incorporated within the plurality of standard symbols; and incorporating the bonus symbol with the corresponding standard symbol for the determined location.

Preferably, a plurality of bonus symbols is incorporated into the reel and the method includes the steps of:

determining the number of bonus symbols to be incorporated into the reel; and for each bonus symbol to be incorporated:

a) determining the location at which the bonus symbol is to be incorporated within the plurality of standard symbols; and b) incorporating the bonus symbol with the corresponding standard symbol for the determined location.

Preferably, the reel is used in a standard game having predetermined probabilities (for outcomes and symbol appearance) and whereby the bonus symbol is incorporated into the plurality of standard symbols without affecting the standard game probabilities. Preferably, the reel has a reel length (or number of symbols on the reel, or number of virtual symbols on the virtual reel) and the incorporating of the bonus symbol into the reel (or virtual reel) does not affect the reel length or total number of symbols.

Preferably, the bonus symbol is incorporated with the corresponding standard symbol by superimposing the bonus symbol on the standard symbol such that both the standard symbol and the bonus symbol are visible in physical format or virtual reel format. More preferably, the bonus symbol is incorporated with the standard symbol with transparency or translucency of one or more of the symbols.

Another aspect of the invention is an electronic gaming machine (EGM) for providing a spinning reel game having a standard game and a bonus feature, the EGM including:

a processor for determining the outcome of the standard game;

a display for displaying the outcome of the standard game;

the standard game including at least one electronic reel having a plurality of standard symbols, each one of the plurality of standard symbols being located at a unique location on the reel, a portion of the reel to be displayed on the display as the outcome of the standard game;

the processor further adapted to:

a) determine the location at which a bonus symbol is to be incorporated within the plurality of standard symbols;

b) incorporate the bonus symbol with the corresponding standard symbol for the determined location; and c) provide a bonus game when the bonus symbol is displayed in the outcome of the standard game.

Preferably, a plurality of bonus symbols are incorporated into the reel or virtual reel and the processor is adapted to:

a) determine the number of bonus symbols to be incorporated into the reel; and for each bonus symbol to be incorporated:

i) determine the location at which the bonus symbol is to be incorporated within the plurality of standard symbols; and ii) incorporate the bonus symbol with the corresponding standard symbol for the determined location.

The bonus game may be triggered by the display of one bonus symbol or multiple bonus symbols. Preferably, the standard game has predetermined probabilities and the bonus symbol is incorporated into the plurality of standard symbols without affecting the standard game probabilities. Preferably, the reel has a reel length and number of symbols per reel (physical or virtual) and the incorporating of the bonus symbol into the reel does not affect the reel length or number of total symbol positions on the virtual reel.

Preferably, the bonus symbol is incorporated with the corresponding standard symbol by superimposing the bonus symbol on the standard symbol such that both the standard symbol and the bonus symbol are visible. More preferably, the bonus symbol is incorporated with the standard symbol with transparency or translucency.

The invention also provides a display arrangement for a terminal, the arrangement including a first display screen and a second display screen overlaid on the first screen, or virtual screen display that are electronically integrated and simultaneously displayed on a single monitor as a single screen display.

The second screen can be transparent, semi-transparent, translucent, discontinuously translucent or transparent, or partially transparent.

The second screen can be adapted to display an image overlaid on a first image displayed on the first screen.

The second image can be non-transparent, partially transparent, or semi-transparent. In one example, the standard symbol and bonus symbol are both displayed adjacent to each other in a symbol area.

The display arrangement can be incorporated in an electronic gaming machine.

BRIEF DESCRIPTION OF THE DRAWINGS

An embodiment or embodiments of the present invention will now be described, by way of example only, with reference to the accompanying drawings, in which:

FIG. 6 illustrates a window display of an EMG;

FIG. 7 illustrates a window display of an EMG with a bonus trigger symbol;

DETAILED DESCRIPTION

The invention will be described with reference to an electronic gaming machine (EGM) being programmable to implement one or more different wagering games.

Figure 1:
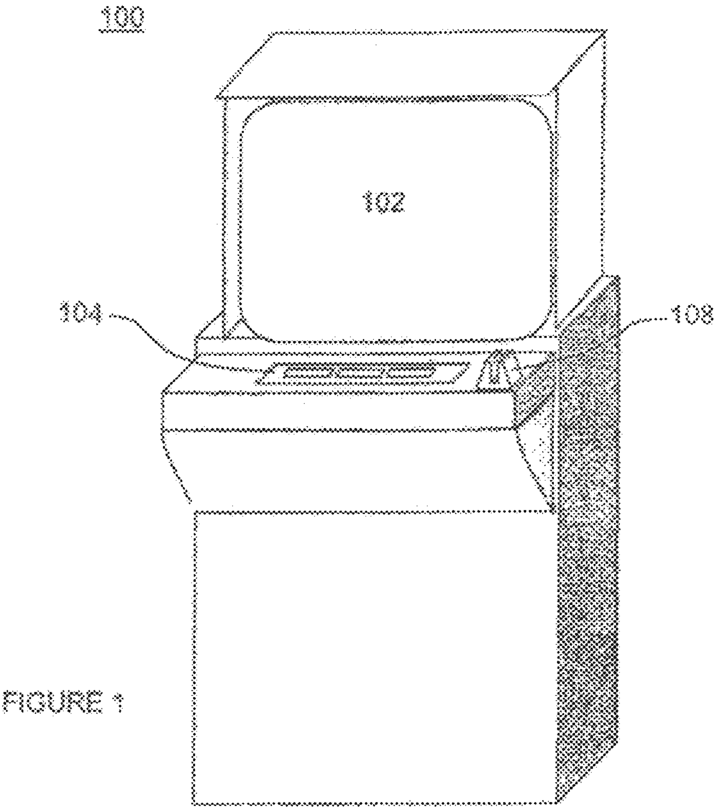
FIG. 1 is a diagram illustrative of an electronic gaming machine.

FIG. 1 is a diagram illustrative of an electronic gaming machine 100, including a display screen 102, player input buttons 104, and credit or currency input 108. When a player has entered sufficient credits in credit input 108, the player can select a game using the player input buttons 104 or touch screen buttons (not shown) displayed on the display screen 102, or a game can automatically be selected. The player can also select the paylines and credits per line, again using the player input buttons 104.

Figure 2:
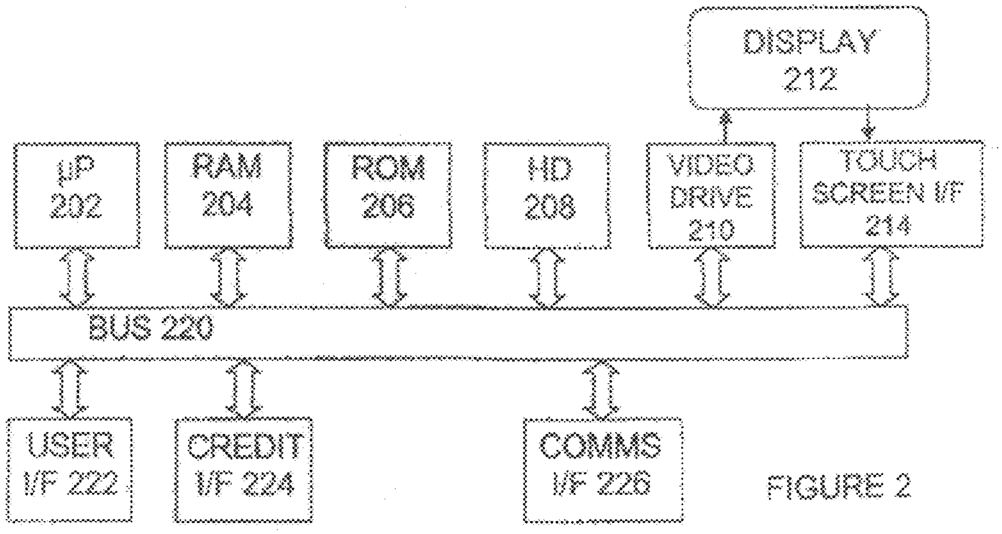
FIG. 2 is a block schematic diagram of functional elements of an electronic gaming machine.

FIG. 2 is a block schematic diagram of functional elements of an EGM including a processor 202 shown, for illustrative purposes only, as connected via bus 220 to a plurality of functional elements. The EGM can include a display 212 with associated video driver 210 and touch screen interface 214, various storage devices, such as RAM 204, ROM 206 and hard drive 208, a user interface 222, credit interface 224, and communication interface 226. The EGM can be a stand-alone machine, or it can be connected to a network via the communication interface 226, to enable the machine to participate in multi-game jackpots. In addition, the EGM may be programmed via the communication network from a central control and management processor, so that, for example, new games can be programmed and downloaded into the EGM.

Figure 3:
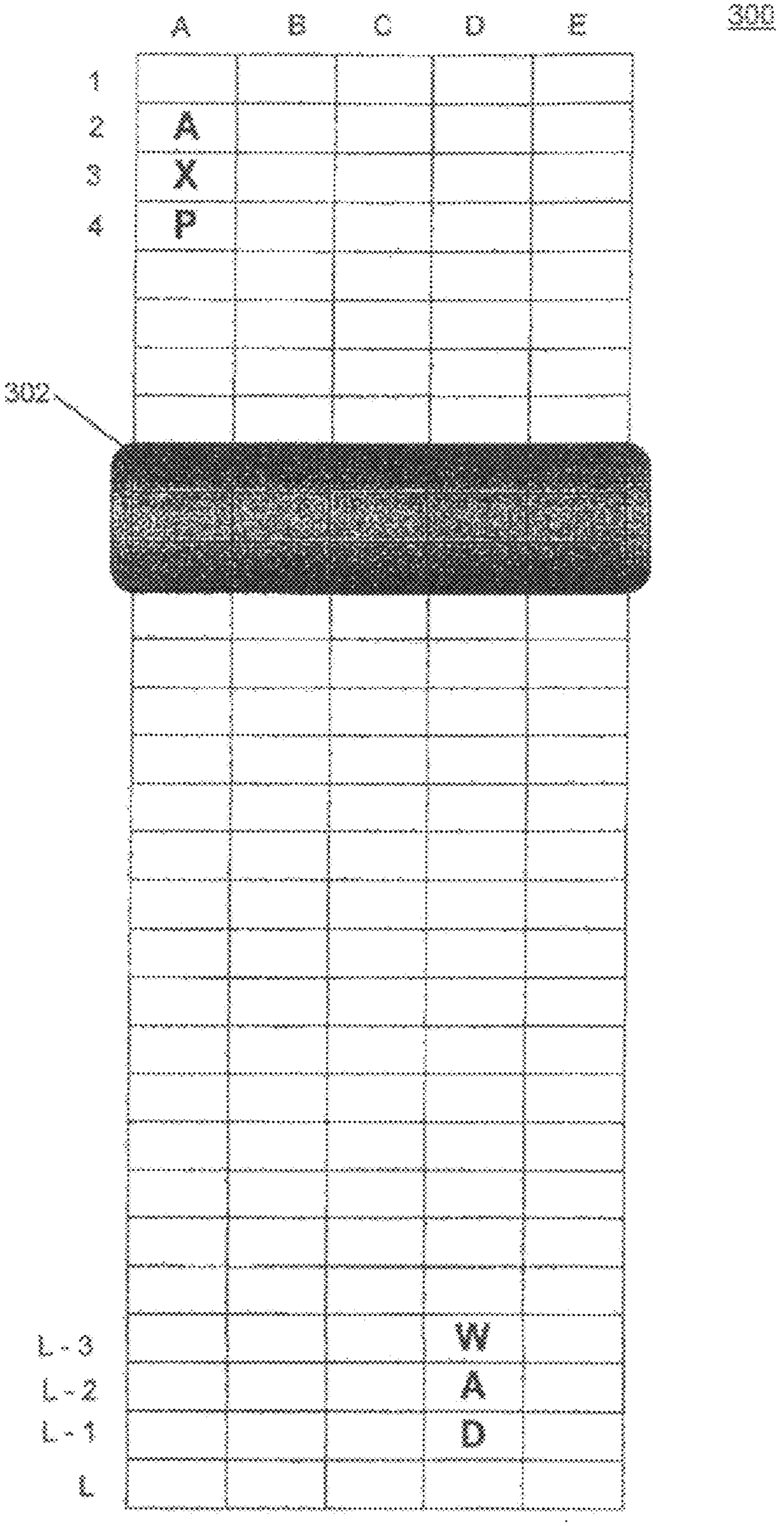
FIG. 3 represents a five-reel array.

In an EGM producing a reel display, each reel has a plurality of symbols L, and their relative position on the reel is usually fixed, so the player sees a window displaying a number of rows in which a sequence of symbols scroll down the column in which the reel is displayed. However, as the reels are virtual and flash by as marginally distinct images, this is optional. The symbols of the reel can thus be defined in terms of the particular reel, the specific symbol, the probability of each specific symbol and/or the place of the symbol in the sequence of symbols. FIG. 3 represents a five-reel (five-column) array 300, having reels A, B, C, D, E, each reel having L symbols. The symbols are displayed in an example of a repeating sequence, so that 1 follows L (or, alternatively, L follows 1) in a loop until the reel stops. A window 302 spanning three rows and five columns is shown to indicate a pay window on the screen. Thus, a symbol can be represented by the column identifier (A, B . . . E for the five-reel example) and the row number, where one symbol is notionally assigned as the start symbol 1. An image is displayed as the symbol, and the images, and/or combinations of images, on a payline are allocated different values in the associated paytable.

When the EGM is programmed, the program thus includes the parameters of each symbol, including the reel, the symbol position, and the image details (the symbol type). The probability of a particular symbol being displayed on a reel or a virtual reel is determined by the number of that type of symbol in a reel divided by the number of frames (e.g., blanks and symbols) in the reel (L). Thus, where there is only one symbol of a particular class of symbol in a reel, its probability of appearing in a specific position, such as the centre line of the window 302, is 1/L (when there are L symbols and blanks as the total number of frames in the reel). In playing a game, the program can use a pseudo-random number generator to determine which symbols will be displayed in the window 302 for each reel by selecting a number between 1 and L for each reel to appear, for example, on the centre line. Thus a particular symbol and its neighbouring symbols (each symbol typically being independently selected, either randomly or pseudo-randomly) will appear in the window 302 where three lines are displayed.

It will be understood that, in different embodiments of the invention, each reel A, B, C, D and E may be a different length and that the lengths of each reel may be independent of one another. That is, there is no requirement that the reel lengths be equal, multiples of each other, or have any other dependency on one another. Accordingly, the probability of a particular symbol appearing in a specific position in the window 302 is dependent on the number of symbols of that particular symbol contained on that particular reel and the length of that reel.

In FIG. 3, three consecutive symbols A, X, P are shown in reel A at positions 2, 3, and 4, and a further three consecutive symbols W, A, D are shown in reel D at positions L-3, L-2, and L-1. FIG. 3 illustrates the position of the reels at the beginning of a game. For the sake of explanation, row 1 is shown at the top of the matrix. In practice, the symbol corresponding to row 1 at the beginning of a next game will be in a position determined by the position of symbol 1 as a result of the previous game.

FIG. 6 shows a window 600 after a game spin. As shown in FIG. 6, during the playing of a game, the symbol A3, which is shown as the letter X at 604, is randomly chosen as the symbol to be displayed on the middle line of the window 600, so the symbols A2 (the letter A at 602) and the symbol A4 (the letter P at 606) are shown in the first column in the window 600 on either side of the X at 604. Similarly, for reel D, the symbol A corresponding to the position L-2 in FIG. 3 has been randomly selected to be displayed on the centre row of the window 600.

Also shown in FIG. 6 are five A symbols, one on each reel. The five A symbols are located on the fourth payline, which is illustrated by the dotted lines. Thus, if the player has selected four or more paylines, this will result in the awarding of a corresponding payout.

Figure 4:
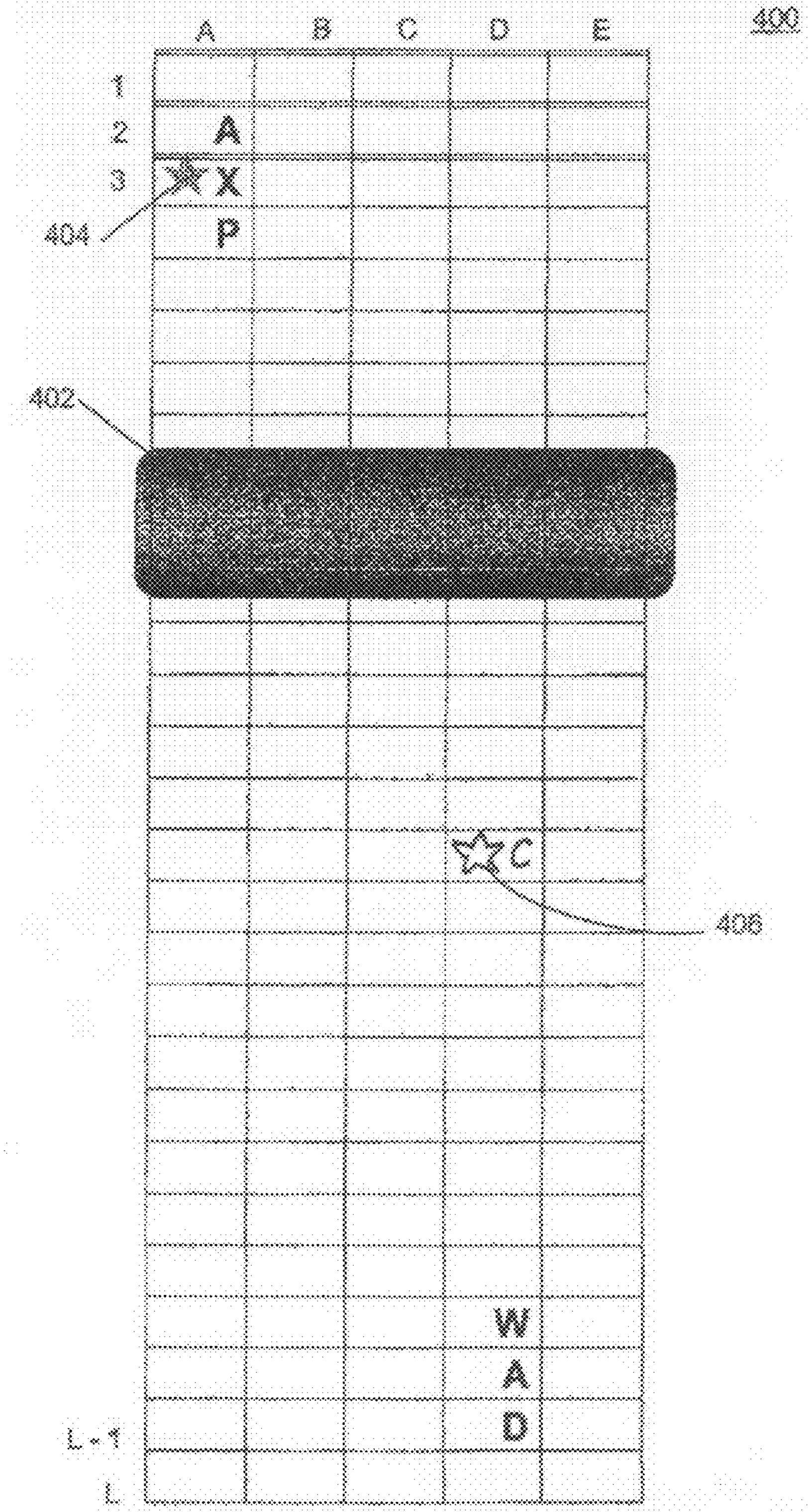
FIG. 4 shows a reel arrangement with the addition of a pair of bonus trigger symbols.

FIG. 4 shows a reel arrangement 400, similar to that of FIG. 3, with the addition of a pair of bonus trigger symbols 404, 406, which have been added to randomly selected reel positions as determined by the game program. The bonus trigger symbols 404, 406 are shown as stars, but other symbols can be used. The bonus trigger symbols 404, 406 are superimposed on the standard game symbols. Preferably, the bonus trigger symbols 404, 406 are semi-transparent so the underlying standard symbol can be recognized by the player. The bonus trigger symbol 404 has been added to the reel position A3, which carries the standard symbol X. A second bonus trigger symbol 406 has been added to reel D.

As shown in FIG. 7, when the game spin has concluded, the same symbols are displayed as in the window 600 of FIG. 6, but in FIG. 7, the middle symbol on reel A has a bonus trigger star 707 superimposed on it. Because the second bonus trigger symbol 406 was not in a reel position selected to be displayed, this bonus trigger symbol 406 is not displayed on the three symbols of reel D shown in FIG. 7. While in this example bonus trigger symbols 404, 406 have been added to reel A and reel D, in other embodiments, bonus trigger symbols are added to other reels. For example, bonus symbols could be added to reels A and B, A and C, B and C, and the like. In some embodiments, only one reel is chosen to contain one or more bonus symbols. In other embodiments, consecutive reels are chosen to each contain one or more bonus symbols. In further embodiments, all reels contain one or more bonus symbols. Some embodiments may randomly select one or more reels for containing one or more bonus symbols. In the presently described embodiment, the bonus game is triggered if both bonus trigger symbols 404, 406 are present in an active payline. Other embodiments require one or, in some embodiments, both of the trigger symbols to appear anywhere in the window 402 and not necessarily in an active payline.

As discussed above, the addition of an additional symbol having a bonus trigger image will alter the probabilities. Thus, in accordance with an embodiment of the invention, when a bonus trigger is to be displayed, and the program has determined the location in which it is to be in the reel sequence, a new symbol having the original symbol plus a superimposed bonus trigger are substituted in the chosen location without altering the total number of symbols (L) in the reel.

This can be done in several ways.

A first option is to substitute a complete set of replacement reels (physical or virtual reels) having the bonus trigger superimposed or otherwise added on the selected symbols.

In a second option, only those reels in which the bonus trigger is to be inserted can be substituted by a reel (physical or virtual) having the bonus trigger superimposed on the selected symbols.

A third option is to substitute the combined symbol for the original symbol in the reel in the selected location. This can be done, for example, by providing a library with two versions of each symbol, a standard version and a combined version with the semi-transparent bonus trigger overlay. Then, when a location for a bonus trigger is selected, the combined symbol can be called for that location. For the other locations, the standard version can be called. In effect, these procedures accomplish the following results:

1) an underlying symbol game is provided with established probabilities and odds for symbols and outcomes;
2) a bonus event is added to the underlying symbol game;
3) the original probabilities for at least symbols is retained;
4) bonus triggering events are added to the underlying game by the addition of one or more bonus symbols or bonus indicators (e.g., highlighting, color changing, flashing, brightening, dimming, framing of pre-existing symbols for the underlying game); and
5) these bonus triggering events or symbols do not alter the underlying game symbol distribution or mapping or probabilities, but are, in effect, overlaid on the existing underlying game symbol distribution or mapping, in physical reels or virtual reels.

In a further variation, one or more symbol locations on each reel can be programmed to have a standard symbol or a standard symbol plus one or more of the bonus triggers or symbols superimposed thereon. In other words, the symbol images can be programmed to have the standard symbol displayed with the processor making a determination, randomly providing or effecting a mathematical option of superimposing the trigger symbol thereon as an overlay. In this embodiment, each image of a standard symbol in the software can include an optional feature that calls for the bonus trigger image overlay when a symbol location is selected as the location of a bonus trigger symbol. To make this system more generally applicable, each symbol location can have this option, so the game program can be executed on software to select any position in which to include a bonus trigger.

In yet a further and preferred variation, the underlying standard symbols do not change and the bonus symbol is superimposed with transparency over the standard symbol. That is, the standard symbol and the bonus symbol are separate graphics that are stored on the EGM. When the reels come to rest and if the location on which the bonus symbol was to be placed is in view, the EGM superimposes the bonus symbol on the standard symbol with transparency. That is, from the player perspective, the graphics are combined such that both the standard symbol and the bonus or trigger symbol are viewable.

Figure 5:
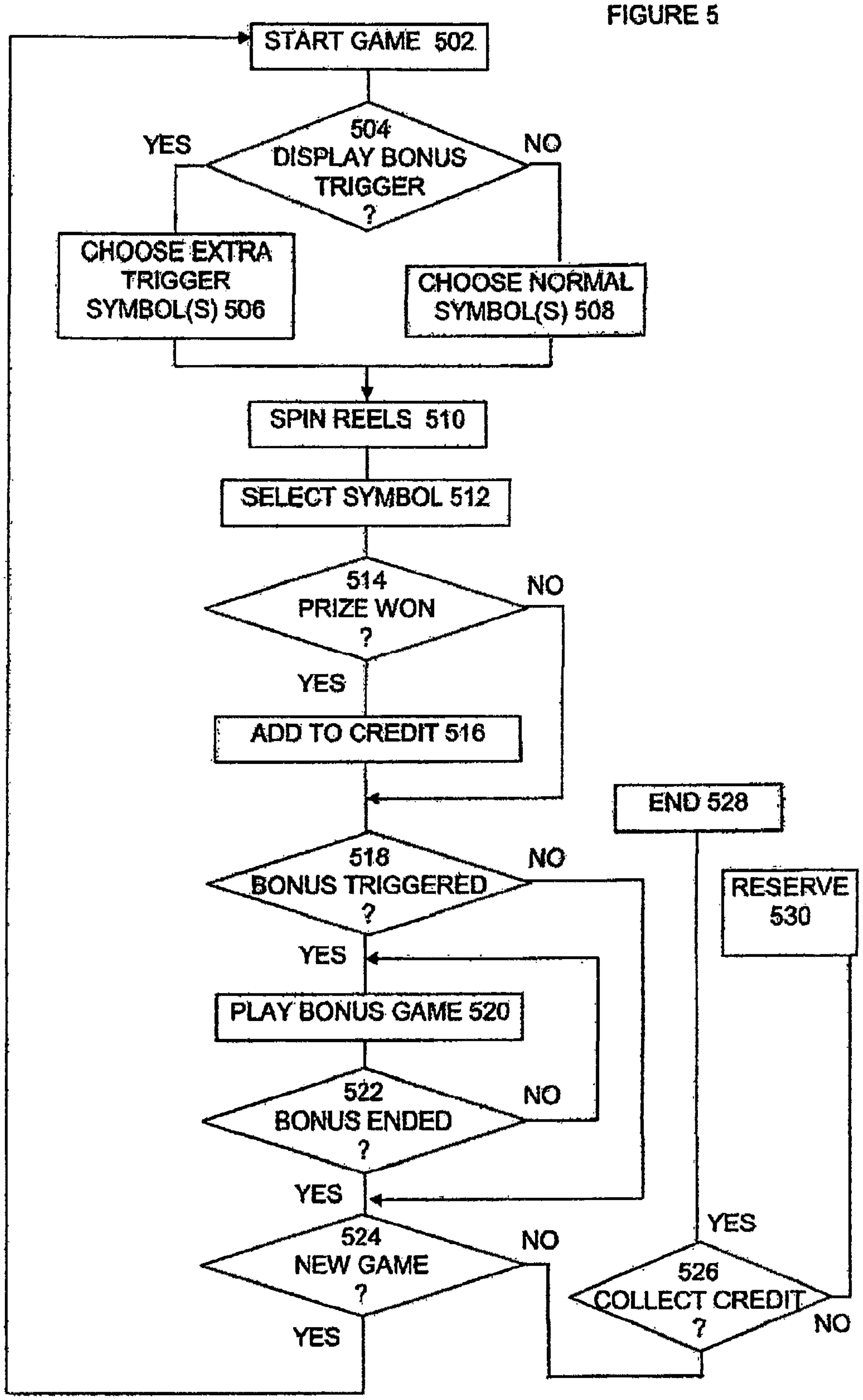
FIG. 5 is a flow diagram illustrating a selection of a bonus trigger symbol.

FIG. 5 is a flow diagram illustrating the selection of a bonus trigger symbol. At the start 502 of a game, the program determines at 504 whether trigger symbols are to be added. Where trigger symbols are to be added, the program then determines at 506 the location of each trigger symbol. This can be done by random or pseudo-random selection of a symbol position. The symbol at each selected position is then changed to a symbol having the standard symbol for that location with the addition of the trigger symbol overlaid on the standard symbol. The reels are then spun 510 and the stop symbol (the symbol to be displayed on the centre line of the window) is selected 512 for each reel and the reels stopped at the appropriate position. The symbols displayed are then compared with the paylines chosen by the player and then analysed against a paytable to determine if a prize has been won at 514. Where a prize is won, the appropriate number of credits are added to the player's credits at 516.

Where the credits have been paid, or where no prize has been won, a second analysis of the displayed symbols is carried out at 518 to determine if a bonus trigger has been displayed. The bonus trigger can comprise the display of one bonus symbol or plural bonus symbols. Where a bonus has been triggered, the bonus game is played at 520 until a bonus termination event 522 occurs. Examples of bonus games include the player choosing from a number of display symbols to display a hidden prize, a random selection of prizes from those displayed on the EGM display, a calculation that is hidden from the player and is displayed only if won, and any other game as would be suitable. Bonus awards won during the playing of the bonus game can include the award of credits, the winning of a jackpot, free spins, a physical prize, a linked prize or jackpot, a prize or jackpot local to the specific EGM, or other prize. The player can then decide whether to continue play at 524, or to collect the credits 526 and end the game 528, or to reserve the machine for the permitted reservation period at 530.

In an embodiment of the present invention, a bonus feature is triggered by bonus or trigger symbols that are superimposed on the standard reel symbols. If a symbol containing a bonus symbol appears in one of the active paylines, the bonus feature is triggered. As the bonus symbols are superimposed on the existing reel symbols, the bonus symbols do not affect the length of the reel to which they are added. The number of bonus symbols superimposed on the reels and the reel length therefore determine the hit rate.

For example, if a particular bonus feature has a desired hit rate of 1 in 75, then superimposing one bonus symbol onto one of the symbols on the reel length consisting of 75 symbols will result in a hit rate of 1 in 75. However, the hit rate and the reel length are rarely the same and further calculations are required in instances where the reel length is different from the hit rate.

An alternative description for the present technology can be presented as a method of displaying a bonus symbol on a virtual reel during play of an underlying electronic wagering game. That underlying game has a plurality of standard symbols used in the underlying electronic wagering game. Each one of the plurality of standard symbols is either located at a unique location on the virtual reel or is pseudo-randomly provided from a set of virtual symbols available for display at displayed positions on the virtual reel. The virtual reels are to be displayed on an electronic gaming machine display adapted to display at least a selected portion of the virtual reel (e.g., three rows and five columns) or other selected portions (e.g., three rows and three columns). The method may include the steps of:

- determining the location at which, or the probability of which, the bonus symbol is to be incorporated within the plurality of standard symbols; and
- incorporating the bonus symbol with the corresponding standard symbol for the determined location or at a probability-determined occasion.

In performing this method, probabilities for selection of individual bonus symbols are provided and those probabilities for selection of individual bonus symbols are dependent upon probabilities for any underlying standard symbol. That is, the underlying standard symbols have their own probability distribution and the bonus symbols have their own independent probability distribution. Even if it is desired to have a specific bonus symbol (such as the casino name) associated with a particular symbol (such as a BLUE SEVEN), the BLUE SEVEN may have a probability of 1 in 100 and the casino name may have a probability of 1 in 3 with respect to the appearance of the BLUE SEVEN, so that the combination of the BLUE SEVEN and casino name would occur only 1 in 300 times. If the bonus symbol always appears with designated symbol, then the probability of the casino name appearing is 1 in 300, which is independent of the individual probabilities of the individual standard symbols.

The following methods described below are examples of the methods that can be used to determine how many bonus symbols should be superimposed on symbols on the reel on each spin. Importantly, the number of bonus symbols superimposed on the reels is variable from spin to spin in some embodiments, and may change every spin in order to achieve the required hit rate.

In a first method, let the reel length of the given reel be L. If there are n bonus symbols superimposed on the regular reel symbols, then the chance of a particular bonus symbol landing in a single viewable position of the stopped reel is n in L or 1 in L/n.

Assume the desired hit rate for landing the symbol in a desired position is precisely 1 in X. If X=L then n would need to be 1. Equivalently, n times X must equal L. When L is not an integer multiple of X, then n will not be a whole number. n cannot be a non-whole number, since there cannot be a fraction of a bonus symbol superimposed (it must either be superimposed or not). In these situations there must be a variable number of bonus symbols appearing in each spin, although the average number of bonus symbols superimposed may include a fraction.

Take, for example, a hit rate of 1 in 75 with a reel length of 100. If one symbol is superimposed, then the hit rate is 1 in 100, which is too low. If two symbols are superimposed, then the hit rate is 2 in 100 (or 1 in 50), which is too high. Therefore, to ensure the desired hit rate of 1 in 75, sometimes one symbol is superimposed and sometimes two symbols are superimposed.

Assume L/2<x<L, and before the beginning of each game a decision is made as to whether n=1 or n=2. In this example, this relates to adding either one or two bonus symbols to random reel positions.

If v=L/X and with a probability 2-v of the time one symbol is added else two symbols are added.

1 symbol is added 2−v=2−(100/75)=2/3=66.6% of the time.

2 symbols are added v−1=(100/75)−1=1/3=33.3% of the time.

Then the average number of symbols added is $$n_{av}=1*(2-v)+2*(v-1)=v$$

$$n_{av}=1*(2-100/75)+2*(100/75-1)=v=1.33$$

Now, $n_{av}$ times X is $$v*X=(L/X)*X=L$$

as desired. Therefore, on average we add 1.33 bonus symbols (or assign probabilities to the selection of individual bonus symbols) to each spin, which gives a hit rate of 1 in 75.

For 2L<x<3L we would have $$n_{av}=2*(3-v)+3*(v-2)=v$$

and so on.

A sub-table representing some probabilities in this class of scenarios is shown in Table 1 below.

TABLE 1

| | 0 < v <= 1 | 1 < v <= 2 | 2 < v <= 3 | 3 < v <= 4 |
|---|---|---|---|---|
| 0 | 1 − v | 0 | 0 | 0 |
| 1 | V | 2 − v | 0 | 0 |
| 2 | 0 | v − 1 | 3 − v | 0 |
| 3 | 0 | 0 | v − 2 | 4 − v |
| 4 | 0 | 0 | 0 | v − 3 |

A further method according to the technology disclosed and claimed herein may include the following:

If a maximum number of symbols that can be added is set to 5, for example, then, regardless of the reel length, if the desired hit rate was again 1 in X we could have:

$p_0$ being the probability of 0 being added to the reel;
$p_1$ being the probability of 1 being added to the reel;
$p_2$ being the probability of 2 being added to the reel;
$p_3$ being the probability of 3 being added to the reel;
$p_4$ being the probability of 4 being added to the reel;
$p_5$ being the probability of the maximum of 5 being added to the reel;

(Note. $p_0+p_1+p_2+p_3+p_4+p_5=1$)

Hence, $$n_{av}=0*p_0+1*p_1+2*p_2+3*p_3+4*p_4+5*p_5$$

The p values could be chosen so as to ensure $n_{av}$=L/X.

For example, $p_0=0.20$; $p_1=0.10$; $p_2=0.20$; $p_3=0.20$; $p_4=0.10$; $p_5=0.20$ or, $p_0=0.40$; $p_1=0.00$; $p_2=0.00$; $p_3=0.15$; $p_4=0.20$; $p_5=0.25$ In both these examples $n_{av}$=2.5, which would be appropriate when, for example, L=50 and X=20.

Using the methods described above, a specific structure can be put in place. The particular structure chosen can ensure that, for any value of L, the probability of matching the added special symbol is always 1 in X over a number of spins or multiple numbers of games. In another example of the invention, the overall desired probability of a bonus event occurring is maintained by adjusting the probability of games played over a defined period of time, or over a defined number of games.

The trigger symbols can be added in a number of ways. For example, the symbols may be located at randomly chosen positions on the reel, or the trigger symbols can be added at equally spaced locations on the reel.

For example, if the reel length is L=50, then a random position from 1 to 50, inclusive, is chosen.

Suppose, r=14.

This is the position at which we could place the first such symbol.

Then the second symbol, rather than being selected from a further random selection of remaining positions, would be placed at position r+half of 50, that is, position 39.

It is preferred that, if the first chosen position is r, then the second symbol will be placed at $$(r+24)\text{mod}50+1.$$

For example, if r=34 then 5 is the other position selected.

So, for any even reel length L the two positions would be

1st chosen position=r; and

2nd chosen position=(r+L/2−1) mod L+1.

Further, for general reel length L and n symbols to be allocated, in order to equally space them (as best as possible), the following formula can be used:

$n^{th}$ chosen position=(r+ROUND[(n−1)*L/n]−1)mod L+1), where r is just the random position arrived at by a random number generator.

There are numerous available computer languages that may be used to implement embodiments of the invention, among the more common being Ada, ALGOL, APL, awk, BASIC, C, C++, COBOL®, DELPHI®, EIFFEL®, Euphoria, Forth, Fortran, HTML, Icon, JAVA®, JAVASCRIPT®, Lisp, Logo, MATHEMATICA®, MATLAB®, Miranda, Modula-2, Oberon, Pascal, PERL®, PL/I, Prolog, PYTHON®, Rexx, SAS®, Scheme, sed, Simula, Smalltalk, SNOBOL, SQL, VISUAL BASIC®, VISUAL C++®, LINUX® and XML.

Any commercial processor may be used to implement the embodiments of the invention either as a single processor, serial or parallel set of processors in the system. Examples of commercial processors include, but are not limited to MERCED®, PENTIUM®, PENTIUM II XEON™, CELERON®, PENTIUM PRO™, EFFICEON™, ATHLON®, AMD® and the like.

Display screens may be segment display screens, analogue display screens, digital display screens, CRTs, LED screens, plasma screens, liquid crystal diode screens, and the like.

Figure 8:
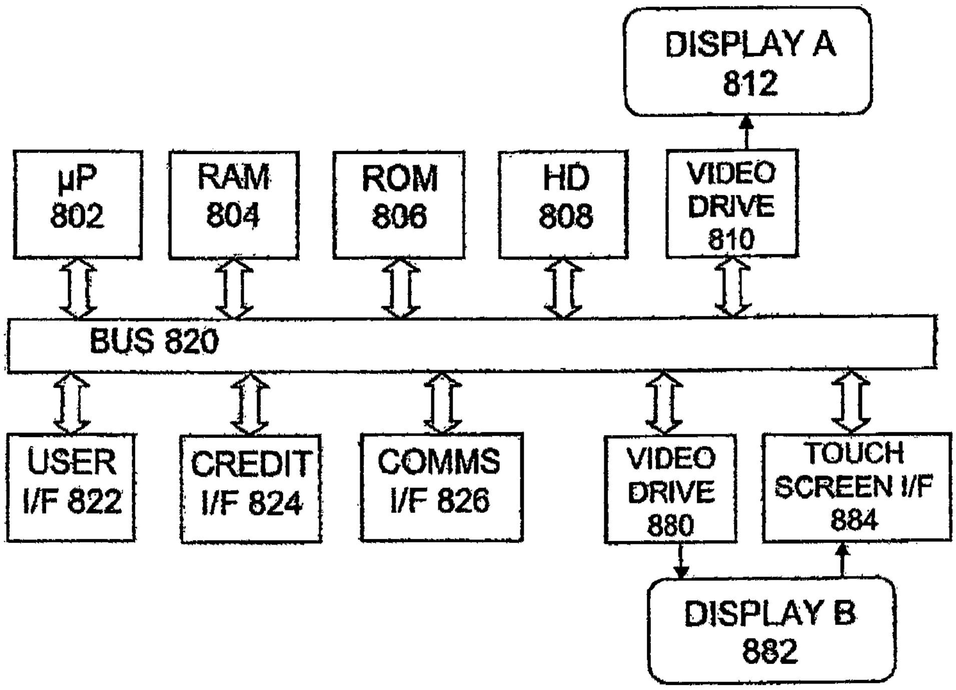
FIG. 8 is a schematic block diagram of a terminal having a double screen.

FIG. 8 is a schematic block diagram of a dual-screen terminal or EGM, including a processor 802 shown, for illustrative purposes only, as connected via bus 820 to a plurality of functional elements. The EGM can include a display 812 with associated video driver 810, various storage devices, such as RAM 804, ROM 806, and hard drive 808, a user interface 822, credit interface 824, and communication interface 826. The EGM can be a stand-alone single-player machine, or it can be connected to a network via the communication interface 826 to enable the machine to participate in multi-game jackpots. In addition, the EGM may be programmed via the communication network 826 from a central control and management processor (not shown), so that, for example, new games can be programmed into the EGM. This machine has been modified by the addition of a second screen 882 with associated screen driver 880 and optional touch screen interface 884.

Figure 11:
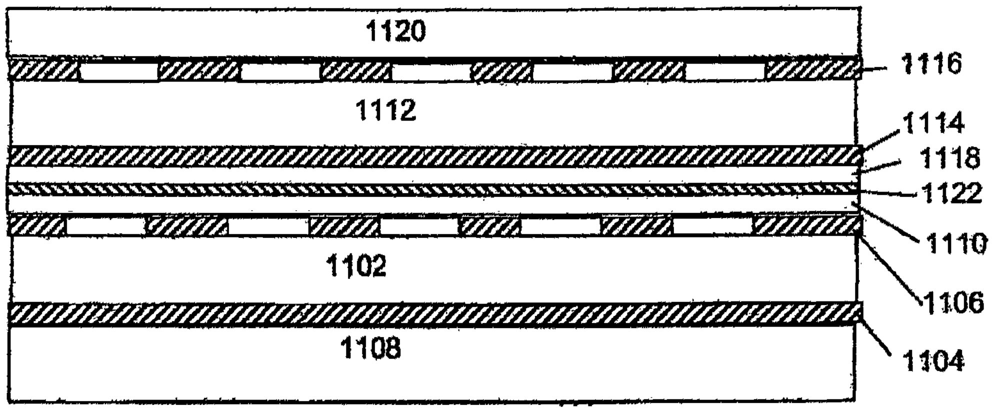
FIG. 11 illustrates a side view of a dual-screen arrangement.

In one embodiment, the second screen 882 is semi-transparent or transparent and physically overlies the first screen 812, as shown in side elevation in FIG. 11. The arrangement of FIG. 11 includes a first LCD screen 1102 with associated transparent control conductors 1104, 1106 on either surface. The control conductors 1104, 1106 can be of tin oxide or other suitable transparent conductor material. The control conductors 1104, 1106 can be formed into row and column arrays, or into specific shapes or parts of shapes from which other shapes can be built up. Additional transparent insulating layers 1108, 1110 can be applied to insulate the control conductors 1104, 1106.

A second LCD screen 1112, having an LC layer with associated transparent control conductor layers 1114, 1116, is provided in this embodiment. Again, the conductor layers 1114, 1116 can be of any desired pattern. For example, where they are intended to superimpose a bonus trigger symbol, such as a star, they can be formed to produce the required shape. Additional transparent insulating layers 1118, 1120 can be provided to insulate the conductor layers 1114, 1116. A conductive shielding layer 1122, also of transparent conducting material, can also be provided to prevent interference between the control signals for the first and second LCDs. When the second LCD is not displaying the bonus signal, it can be semi-transparent or substantially transparent. The image displayed by the second LCD can be non-transparent, partly transparent, or semi-transparent.

Figure 10:
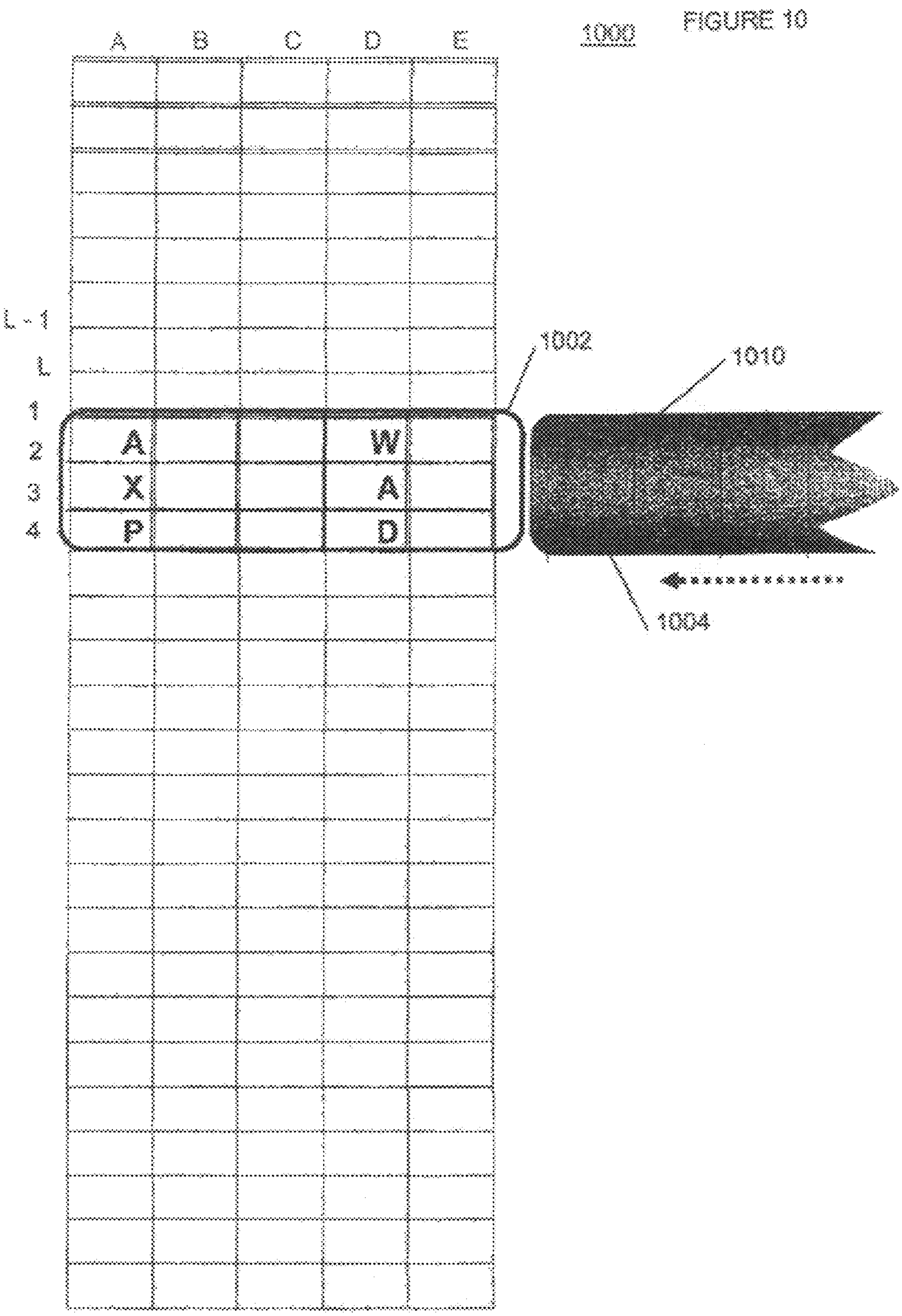
FIG. 10 illustrates a dual-screen display of a game result.

FIG. 10 is illustrative of a game result for a five-reel (A, B, C, D, E), L-row reel set 1000 with a window 1002 showing a three-row result. In column A, the symbols A, X, P, corresponding to rows 2, 3, 4 of column A, are displayed in the window 1002. In addition, the symbols W, A, D are shown for illustrative purposes in column D. Note that the column D symbols will normally have different row numbers from the row numbers of column A (see discussion of FIG. 5).

The window 1002 corresponds to the first LCD screen 1102. A second window 1010 corresponds to the second LCD screen 1112 of FIG. 11. This second window 1010 is, in practice, physically overlaid on the first window 1002, but is shown to the side in FIG. 10 for purposes of illustration. Thus, in practice, the bonus symbol 1004 in the middle row of the second window 1010 would appear overlaid on the symbol X in column A of window 1002.

Figure 9:
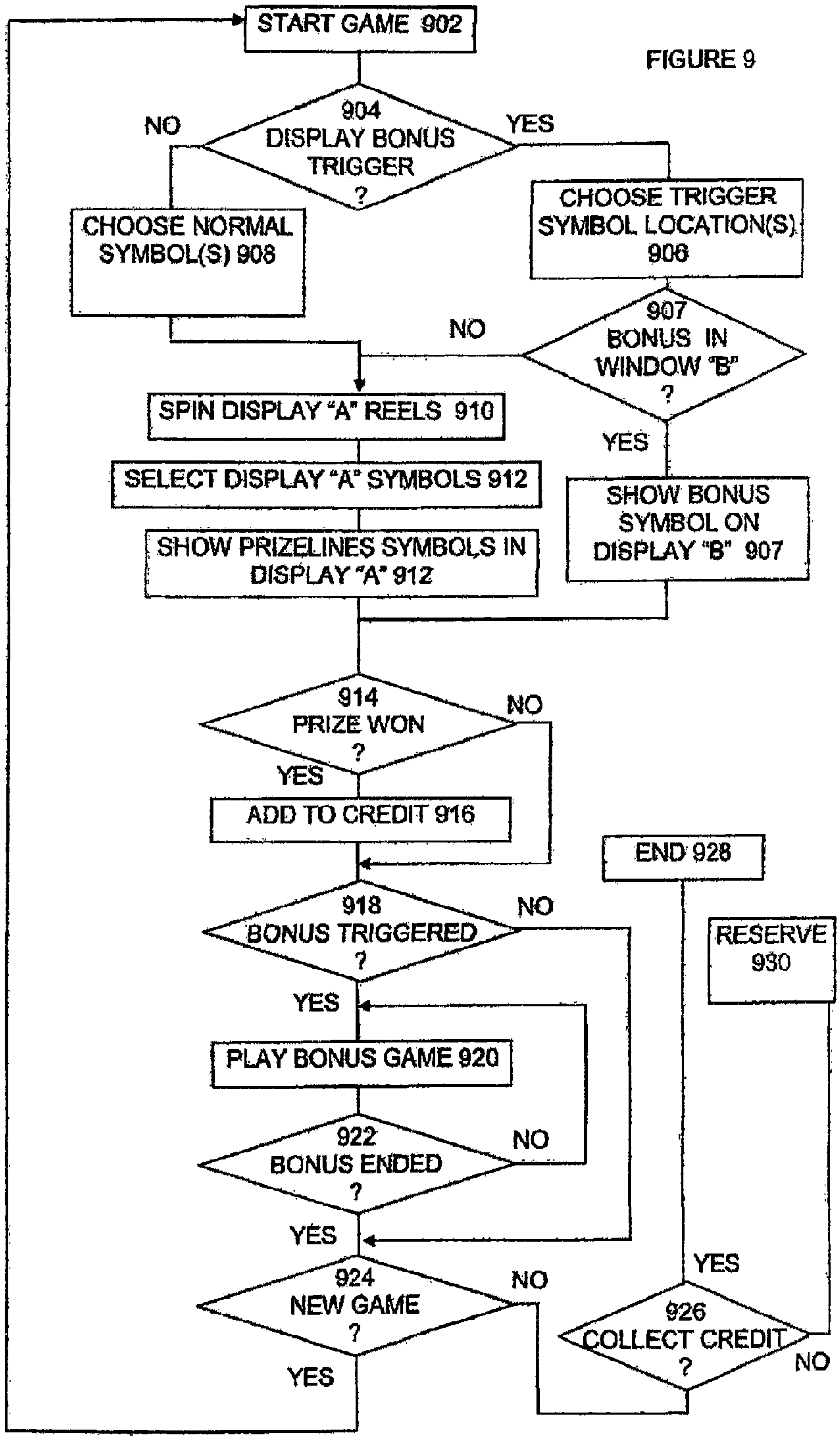
FIG. 9 is a flow diagram illustrating an embodiment of the invention using a dual-screen display.

FIG. 9 is a flow diagram illustrative of the operation of a dual-display EGM. When a game is initiated at 902, a decision is made as to the nature of the bonus display to be made at 904, the locations of the bonus symbols is determined at 906, and the position on the stopped reel is determined at 907, which determines whether or not the bonus symbol will be shown in the window.

The normal reel spin occurs using the first window 1002 (FIG. 10). If the bonus symbol 1004 is to be shown in the window, the second display 1010 is operated to display the bonus symbol 1004 when the reels stop spinning. Subsequently, the prize and bonus determination occurs in a similar manner to that described with reference to FIG. 5.

An advantage of the present invention is that the player is provided with a feeling that the trigger is more random than a usual reel stop combination but less random than a totally mystery trigger.

In this specification, the terms "bonus trigger symbol," "bonus symbol" and "trigger symbol" are used interchangeably.

In this specification, reference to a document, disclosure, or other publication or use is not an admission that the document, disclosure, publication or use forms part of the common general knowledge of the skilled worker in the field of this invention at the priority date of this specification, unless otherwise stated.

Wherever it is used, the word "comprising" is to be understood in its "open" sense, that is, in the sense of "including," and thus not limited to, its "closed" sense, that is, the sense of "consisting only of." A corresponding meaning is to be attributed to the corresponding words "comprise," "comprised" and "comprises" where they appear.

The term "pseudo-random" is used herein to mean that a selection is made on a random basis from within a limited range.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A method of enhancing an underlying symbol display game played on an electronic gaming machine comprising a display and at least one processor, wherein at least some of the following method acts are performed by the at least one processor, the underlying symbol display game having a plurality of symbol locations, each symbol location including an associated displayable symbol of a plurality of displayable symbols, wherein in a play of the underlying game a predetermined number of the plurality of symbol locations are selected and the respective associated displayable symbols are displayed, the resultant combination of displayed symbols determining an outcome of the play of the underlying game, and wherein the probability of each symbol location being selected is a predetermined probability for the underlying symbol display game, the method comprising, prior to a play of the underlying symbol display game and for implementation in the course of one or more consecutive plays of the underlying symbol display game:

non-randomly selecting a specific probability for the display of one or more bonus symbols, to be incorporated into the underlying symbol display game, over the course of the one or more consecutive plays of the underlying symbol display game, wherein the display of one or more bonus symbols at the conclusion of a play of the underlying symbol display game triggers initiation of at least one bonus feature or at least one bonus game;

determining a number of bonus symbols to be incorporated into the underlying symbol display game for each play of the one or more consecutive plays of the underlying symbol display game to meet the non-randomly selected specific probability;

prior to commencing each play of the underlying symbol display game, and for each of the determined number of bonus symbols to be incorporated into that respective play to meet the non-randomly selected, specific probability:

selecting one of the symbol locations; and incorporating the bonus symbol in the selected symbol location in combination with the associated displayable symbol;

wherein the incorporation of each of the determined number of bonus symbols into the underlying symbol display game for each play thereof has no effect upon a frequency of occurrence of an award or an amount of an award for a winning outcome in play of the underlying symbol display game.

2. The method of claim 1, wherein selecting a symbol location for at least one of the determined number of bonus symbols is determined on a pseudo-random basis.

3. The method of claim 2, wherein incorporating the bonus symbol in the selected symbol location in combination with the associated displayable symbol comprises replacing the selected symbol location with a replacement symbol location on which the bonus symbol and associated displayable symbol appear.

4. The method of claim 1, wherein selecting a symbol location for each of the determined number of bonus symbols is determined on a pseudo-random basis.

5. The method of claim 4, wherein incorporating the bonus symbol in the selected symbol location in combination with the associated displayable symbol comprises replacing the selected symbol location with a replacement symbol location on which the bonus symbol and associated displayable symbol appear.

6. The method of claim 1, wherein only a subset of the number of symbol locations is available to be selected for the incorporation of a bonus symbol.

7. The method of claim 6, wherein incorporating the bonus symbol in the selected symbol location in combination with the associated displayable symbol comprises replacing the selected symbol location with a replacement symbol location on which the bonus symbol and associated displayable symbol appear.

8. The method of claim 1, wherein the bonus symbol is incorporated into the selected symbol location in combination with the associated displayable symbol such that the bonus symbol is displayed in a transparent, translucent or semi-transparent form so that the associated displayable symbol can be identified.

9. The method of claim 8, wherein incorporating the bonus symbol in the selected symbol location in combination with the associated displayable symbol comprises replacing the selected symbol location with a replacement symbol location on which the bonus symbol and associated displayable symbol appear.

10. The method of claim 1, wherein the plurality of symbol locations are arranged in a plurality of simulated reels.

11. The method of claim 10, wherein incorporating the bonus symbol in the selected symbol location in combination with the associated displayable symbol comprises replacing the simulated reel in which the selected symbol location is located with a replacement simulated reel in which the bonus symbol and associated displayable symbol appear at a symbol location on the replacement simulated reel corresponding to the selected symbol location.

12. The method of claim 10, wherein incorporating the bonus symbol in the selected symbol location in combination with the associated displayable symbol comprises replacing the selected symbol location with a replacement symbol location on which the bonus symbol and associated displayable symbol appear.

13. The method of claim 12, wherein incorporating the bonus symbol in the selected symbol location in combination with the associated displayable symbol comprises replacing the reel in which the selected symbol location is located with a replacement reel in which the bonus symbol and associated displayable symbol appear on the replacement reel at a location corresponding to the selected symbol location.

14. The method of claim 1, wherein incorporating the bonus symbol in the selected symbol location in combination with the associated displayable symbol comprises replacing the selected symbol location with a replacement symbol location on which the bonus symbol and associated displayable symbol appear.

15. The method of claim 1, wherein incorporating the bonus symbol in the selected symbol location in combination with the respective selected displayable symbol comprises superimposing the bonus symbol onto the respective selected displayable symbol at the selected symbol location.

16. An electronic gaming machine comprising:

at least one display configured to display game information;

at least one processor; and memory associated with the at least one processor and storing a program configured, as executed by the at least one processor, to conduct play of an underlying symbol display game having a plurality of symbol locations, each symbol location having an associated one of a plurality of displayable symbols, wherein in the underlying symbol display game a predetermined number of symbol locations are selected and the respective associated displayable symbols are displayed, the resultant combination of selected symbols determining an outcome of the underlying symbol display game, wherein the probability of each symbol location being selected is a predetermined probability for play of the underlying symbol display game, the program further configured, as executed by the at least one processor, prior to a play of the underlying symbol display game and for implementation in the course of one or more consecutive plays of the underlying symbol display game:

to non-randomly select a specific probability for the display of one or more bonus symbols, to be incorporated into the underlying symbol display game, over the course of the one or more consecutive plays of the underlying symbol game, wherein the display of one or more bonus symbols at the conclusion of a play of the underlying symbol display game triggers initiation of at least one bonus feature or at least one bonus game;

to determine a number of bonus symbols to be incorporated into the underlying symbol display game for each of the one or more consecutive plays of the symbol display game to meet the non-randomly selected, specific probability; and prior to commencing each of the plays of the underlying symbol display game, and for each of the determined number of bonus symbols to be incorporated for a respective play of the underlying symbol display game to meet the non-randomly selected, specific probability:

to select one of the symbol locations; and to incorporate the bonus symbol in the selected symbol location in combination with the associated displayable symbol;

wherein the incorporation of each of the determined number of bonus symbols into the underlying symbol display game has no effect upon a frequency of occurrence of an award or an amount of an award for a winning outcome in play of the underlying symbol display game.

17. The electronic gaming machine of claim 16, wherein the at least one processor selects a symbol location for at least one of the determined number of bonus symbols on a pseudo-random basis.

18. The electronic gaming method of claim 17, wherein incorporating the bonus symbol in the selected symbol location in combination with the associated displayable symbol comprises replacing the selected symbol location with a replacement symbol location on which the bonus symbol and associated displayable symbol appear.

19. The electronic gaming machine of claim 16, wherein the at least one processor selects a symbol location for each of the determined number of bonus symbols on a pseudo-random basis.

20. The electronic gaming machine of claim 19, wherein incorporating the bonus symbol in the selected symbol location in combination with the associated displayable symbol comprises replacing the selected symbol location with a replacement symbol location on which the bonus symbol and associated displayable symbol appear.

21. The electronic gaming machine of claim 16, wherein only a subset of the number of symbol locations is available to be selected for the incorporation of a bonus symbol.

22. The electronic gaming machine of claim 21, wherein incorporating the bonus symbol in the selected symbol location in combination with the associated displayable symbol comprises replacing the selected symbol location with a replacement symbol location on which the bonus symbol and associated displayable symbol appear.

23. The electronic gaming machine of claim 16, wherein the bonus symbol is incorporated into the selected symbol location in combination with the associated displayable symbol such that the bonus symbol is displayed in a transparent, translucent or semi-transparent form on the display so that the associated displayable symbol can be identified.

24. The electronic gaming machine of claim 23, wherein incorporating the bonus symbol in the selected symbol location in combination with the associated displayable symbol comprises replacing the selected symbol location with a replacement symbol location on which the bonus symbol and associated displayable symbol appear.

25. The electronic gaming machine of claim 16, wherein the plurality of symbol locations is arranged on the display in a plurality of simulated reels.

26. The electronic gaming machine of claim 25, wherein incorporating the bonus symbol in the selected symbol location in combination with the associated displayable symbol comprises replacing the simulated reel in which the selected symbol location is located with a replacement simulated reel in which the bonus symbol and associated displayable symbol appear on the replacement simulated reel at a symbol location corresponding to the selected symbol location.

27. The electronic gaming machine of claim 25, wherein incorporating the bonus symbol in the selected symbol location in combination with the associated displayable symbol comprises replacing the selected symbol location with a replacement symbol location on which the bonus symbol and associated displayable symbol appear.

28. The electronic gaming machine of claim 27, wherein incorporating the bonus symbol in the selected symbol location in combination with the associated displayable symbol comprises replacing the reel in which the selected symbol location is located with a replacement reel in which the bonus symbol and associated displayable symbol appear on the replacement reel at a symbol location corresponding to the selected symbol location.

29. The electronic gaming machine of claim 16, wherein incorporating the bonus symbol in the selected symbol location in combination with the associated displayable symbol comprises replacing the selected symbol location with a replacement symbol location on which the bonus symbol and associated displayable symbol appear.

30. The electronic gaming machine of claim 16, wherein incorporating the bonus symbol in the selected symbol location in combination with the associated displayable symbol comprises superimposing the bonus symbol onto the associated displayable symbol at the selected symbol location.

* * * * *